United States Patent [19]
Cornford

[11] Patent Number: 5,865,223
[45] Date of Patent: Feb. 2, 1999

[54] SECONDARY CONTAINMENT RETROFIT BAG

[76] Inventor: Donald A. Cornford, 33 Greenwood Drive, Fredericton, New Brunswick, Canada, E3A 3T8

[21] Appl. No.: 64,238

[22] Filed: Apr. 23, 1998

[30] Foreign Application Priority Data

May 15, 1997 [CA] Canada ................................ 2205567

[51] Int. Cl.⁶ ................................................ B65D 30/10
[52] U.S. Cl. ............................... 141/88; 141/86; 141/98; 137/312; 383/15; 383/24
[58] Field of Search .................................. 141/86, 88, 98; 184/1.5, 106; 137/312–314; 220/571, 571.1, 573; 383/15, 22, 24

[56] References Cited

U.S. PATENT DOCUMENTS

| | | | |
|---|---|---|---|
| 2,944,563 | 7/1960 | De Blasio et al. | 137/312 |
| 4,603,432 | 7/1986 | Marino | 383/15 |
| 4,844,286 | 7/1989 | Jacobson . | |
| 5,195,650 | 3/1993 | Leidig . | |
| 5,285,914 | 2/1994 | Del Zotto . | |
| 5,339,872 | 8/1994 | Marino | 141/86 |
| 5,379,810 | 1/1995 | Marino | 141/86 |
| 5,437,303 | 8/1995 | Johnson | 137/312 |
| 5,645,103 | 7/1997 | Whitaker | 137/312 |

FOREIGN PATENT DOCUMENTS

| | | |
|---|---|---|
| CA 2022326 | 2/1991 | Canada . |
| CA 2041556 | 3/1994 | Canada . |
| CA 2209678 | 6/1996 | Canada . |
| CA 2153114 | 12/1996 | Canada . |

*Primary Examiner*—J. Casimer Jacyna
*Attorney, Agent, or Firm*—Mario Theriault

[57] ABSTRACT

A fluid impermeable bag for enclosing a lower portion of a residential heating oil reservoir. The secondary containment has an open upper end, a stiff rim around the open upper end and straps extending from the stiff rim above the open upper end for circling an upper portion of a reservoir. The bag is made of a flexible material whereby the bag is collapsible for installation on a new tank or for retrofitting a reservoir in service. In a second aspect of the invention, a flap is detachably affixed to the rim of the bag and is extendible for covering the upper portion of a reservoir installed outdoors. The bag of the present invention is mountable under a heating oil reservoir and is particularly appropriate for preventing environmental spills of all sizes due to common deteriorations of these reservoirs.

20 Claims, 4 Drawing Sheets

5,865,223

SECONDARY CONTAINMENT RETROFIT BAG

FIELD OF THE INVENTION

This invention pertains to secondary liquid containment systems in general, and more specifically, to an oil impermeable containment bag for installation under a residential oil reservoir for containing oil leaks from the reservoir.

BACKGROUND OF THE INVENTION

Because of an increasing concern of our society toward ground water contamination, and of many such cases reported annually, regulatory authorities in several jurisdictions now require that large oil, fuel and gas tanks exceeding 500 gallons for example must have a secondary containment device to prevent leakage in case of a tank rupture or perforation. A common type of secondary containment systems used with above-grade petroleum storage tanks used on farms, construction sites or logging operations is a concrete vault such as the one described in U.S. Pat. No. 5,285,914 issued to William M. Del Zotto on Feb. 15, 1994. These concrete vaults are constructed to resist cracking with thermal expansion and retraction, physical damage due to handling or collision from automobiles or the like.

A second common method for preventing leakage from a storage tank is to install an impermeable bladder inside the tank. This type of installation is illustrated and described in U.S. Pat. No. 5,195,650 issued to Tom Leidig, on Mar. 23, 1993. The bladder is made with a flexible oil impermeable material and has sufficient strength for retaining the liquid content of the tank in case of an accident with the tank or other incidence causing the rupture of the tank.

Although regulations have been developed for large petroleum tanks, there is little or no regulation with regards to residential heating oil reservoirs of 200 gallons or less. These reservoirs are typically made of steel and are known to corrode and to eventually leak. If a leaking reservoir is installed outside a house, heating oil can leak along the foundation wall, seep into the drain tile and be carried with the drainage water around the entire house. If the leak persists over a long period, it can also seep along the well pipes and contaminate the water well if there is a water well on the property. Similarly, if the leaking reservoir is installed inside the house, the leakage can infiltrate under the basement floor and become practically impossible to clean. The fumes emanating from the underground spill could render the house unlivable, and unsaleable. Even decades after the house has been demolished, the flumes emanating from the soil prevents the lawful sale of the property without firstly effecting an in depth remediation of the soil.

This lack of regulation has caused problems for homeowners, banks and insurance companies. As one will appreciate, the problem is not just with the homeowner, who faces massive clean-up costs and a drastic reduction in property value, but with the insurance company holding the insurance policy on the property, and which normally absorb the losses. Typical clean-up costs following a spill from a leaking heating oil reservoir have been reported as being as high as hundreds of thousands of dollars. When the leak gets into the aquifers of a municipality for example, the liability could reach millions of dollars.

Oil spills are not necessarily caused by the complete rupture or perforation of a tank where a substantial portion of the reservoir is spilled on the ground. Oftentimes, a residential oil tank is overfilled and leaks from the threads of the fill or vent pipe or by the level gauge on the top part of the reservoir. Then, precipitation washes out the oil over the surface of the reservoir and entrains the leaking oil into the ground. In other circumstances, leaks will occur along the fitting on the outlet pipe of the reservoir. These leaks are normally relatively small, but are nonetheless harmful to the environment whereas thread leaks are generally not taken seriously and may persist for weeks and months before being fixed.

Despite the increasing awareness of people concerning environmentally hazardous leakages of heating oil and the high cost of soil remediation processes, it is believed that there is no system available in the prior art for installation under new and old reservoirs alike, for preventing severe and light spills from these reservoirs. The reason for this is believed to be primarily due to a lacking of a practical and monetary affordable concept as disclosed herein.

SUMMARY OF THE INVENTION

In the present invention there is provided an oil impermeable bag for enclosing a lower portion of a residential heating oil reservoir. The bag of the present invention is easily mountable around an oil reservoir and is particularly appropriate for preventing environmental spills of all sizes due to a common deterioration of these reservoirs.

In a first aspect of the present invention, the secondary containment bag comprises an open upper end; a stiff rim around the open upper end; and straps extending from the stiff rim above the open upper end for circling an upper portion of the reservoir. The bag is made of a flexible material whereby the bag is collapsible for installation on a new tank or for retrofitting a reservoir in service.

In another aspect of the present invention, the bottom portion of the bag is stitch-free such that its impermeability is always maintained. Furthermore, rubber pads are installed inside the bag under the legs of the reservoir to prevent abrasion of the bottom portion of the bag during installation and use thereof.

In another aspect of the present invention the size of the bag is larger that the horizontal dimensions of the reservoir such that a gap is maintained between the bag and the reservoir. This gap is particularly advantageous for preventing condensation on the outside surface of the reservoir, and for allowing odours from a spill to drift away from the bag and quickly warn a homeowner of the presence of a leak.

In a further aspect of the present invention, the secondary containment bag has an opening through a lower end thereof for circling an outlet tubing system of the reservoir. A flanged connection is bonded to the bag for sealing the opening around the outlet tubing system. The flange connection also comprises a pipe coupling inside the bag for easily connecting the outlet tubing system to the outlet fitting of the reservoir. The bag of the present invention is thereby mountable over new reservoirs; it is removable from a defective reservoir and re-mountable under a replacement reservoir.

In yet another aspect of the present invention, the fluid impermeable bag has a flap detachably affixed to the stiff rim thereof for covering an upper portion of the reservoir. The secondary containment bag with a flap thereon is thereby mountable on a residential heating oil reservoir located outdoors, for simultaneously containing leaks from said reservoir and for preventing precipitations, dust and blown debris from accumulating inside the bag.

Other advantages of the secondary containment bag of the present invention are that it is manufacturable at a reasonable price using common tarp manufacturing equipment.

The bag is deliverable to users in a compact folded form, and is relatively easily comprehensible such that it is mountable under a heating oil reservoir by one or two persons with common plumbing tools and simple instructions.

BRIEF DESCRIPTION OF THE DRAWINGS

Other advantages of the present invention will be apparent from the following description of the preferred embodiments illustrated in the accompanying drawings, in which.

DETAILED DESCRIPTION OF THE PREFERRED EMBODIMENT

Figure 1:
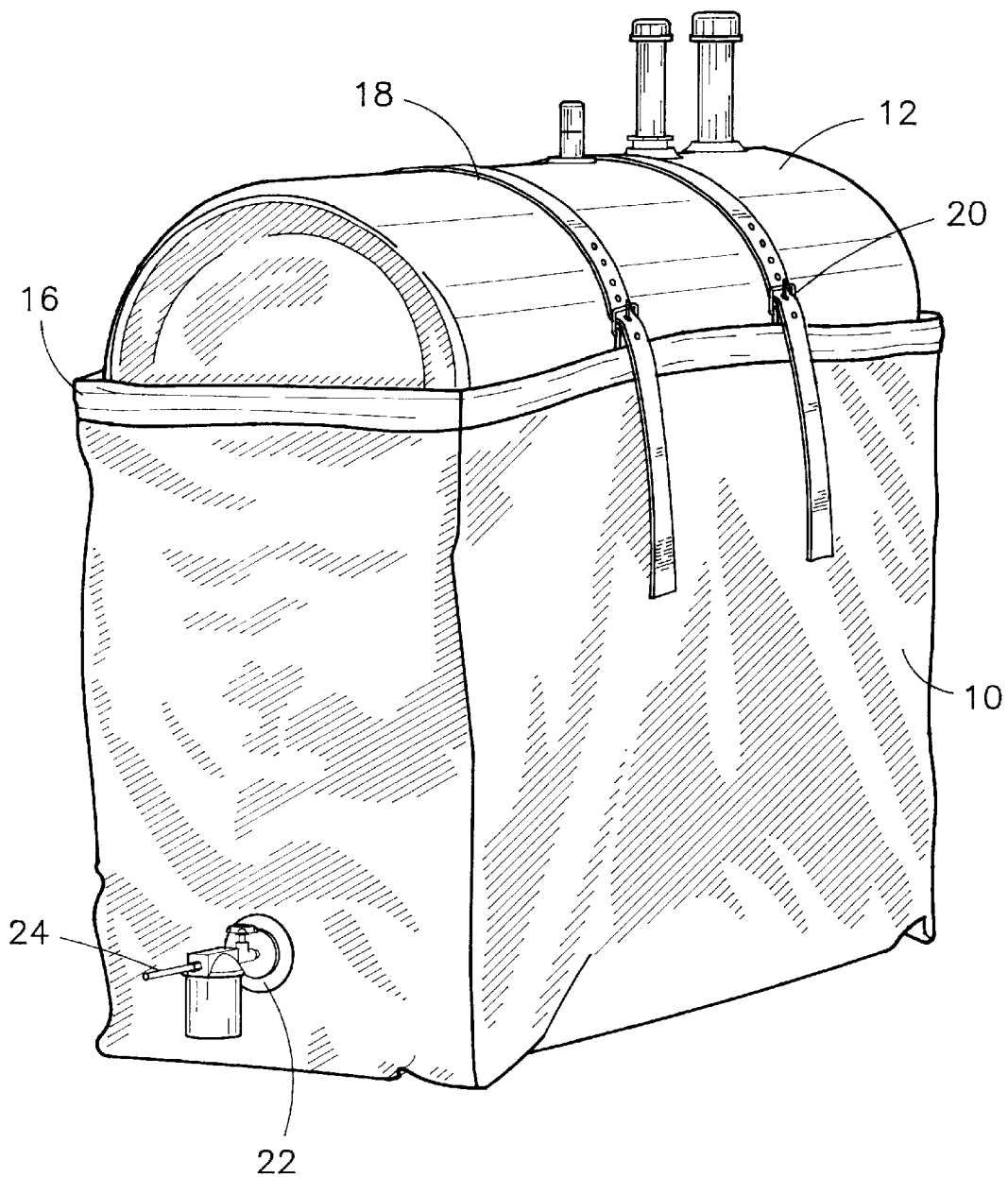
FIG. 1 is perspective view of the front and left end of the secondary containment bag of the first preferred embodiment installed under a residential heating oil reservoir.
Figure 2:
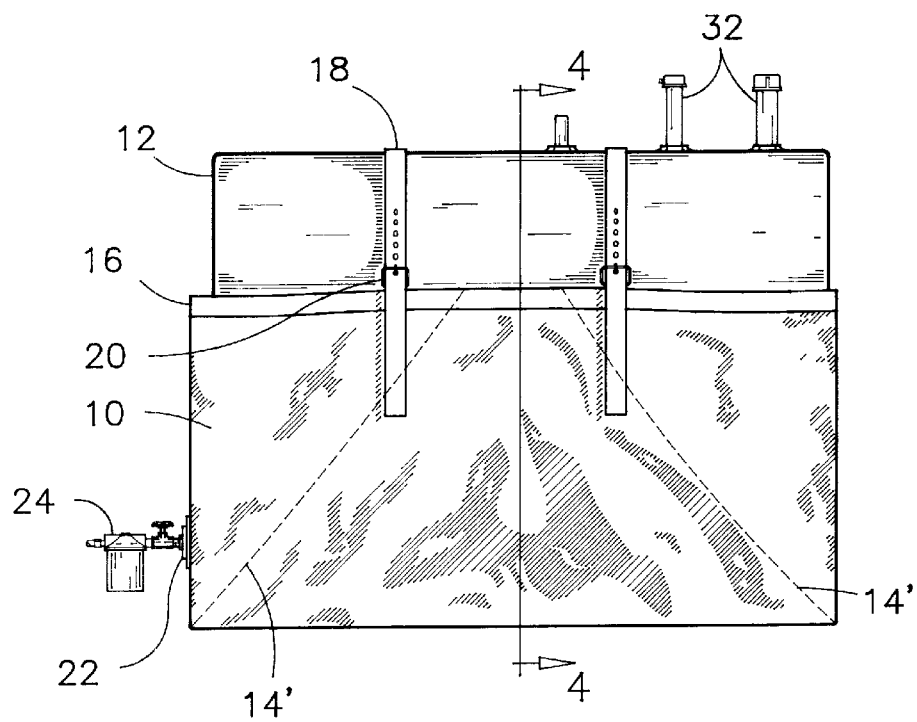
FIG. 2 is a front view of the secondary containment bag of the first preferred embodiment installed under a residential heating oil reservoir.

The secondary containment retrofit bag 10 of the first preferred embodiment is illustrated in its entirety in FIGS. 1 to 6. The oil reservoir 12 also illustrated therein is a 200 imperial gallon heating oil reservoir commonly used in residential heating systems. The secondary containment retrofit bag 10 is installed as a precautionary measure, under the lower portion of the reservoir 12 for containing potential oil leaks from this reservoir.

The secondary containment retrofit bag 10 of the first preferred embodiment is made of a fabric or flexible sheet material which is oil impermeable and fire retardant. The substance of the fabric or flexible sheet material is that of a tarp coated or impregnated with rubber, plastic material or the like, such that the bag is durable and capable of holding the content of the reservoir 12 in case of a leak.

The secondary containment retrofit bag 10 has a rectangular shape to fit the shape of the reservoir 12. The bag is made of a single sheet of fabric or flexible material wherein the folds 14 are tuck inside the bag 12 along the longitudinal walls of the bag 10 as represented by dash lines 14' in FIG. 2. The bag 10 does not have any stitches in its lower portion such that its impermeability is always maintained.

The secondary containment bag 10 of the first preferred embodiment has a horizontal band 16 sewn, or bonded and sewn along the upper edge thereof. A pair of straps 18 and buckle 20 are sewn transversally to the band 16, for supporting the upper edge of the bag 10 at a set height around the reservoir 12.

The band 16 is a continuous band of belting material and is sewn around the entire upper edge of the bag for securing the ends and side portions of the bag 10 together and for forming a fluid impermeable receptacle. The band 16 is preferably made of a fire-retardant stiff belting material or a lifting-sling-type fabric having a width of about 3 inches and a thickness of about 3/16 inch. The purpose of the band 16 is to provide sufficient vertical stiffness to the upper edge of the bag 10 such that the upper edge of the bag remains relatively straight, even when the bag contains a nominal amount of fluid therein. It will be appreciated that in other embodiments, a thinner flat horizontal band (not shown) may be reinforced by placing a flat metal strip or the like between the band and the bag for example before sewing the band to the bag.

The transversal straps 18 are also preferably made with a belting material or a lifting-sling-type material. The straps 18 extend from the band 16 on the rear side of the bag and are attachable to a pair of buckles 20 mounted on the front side of the bag 10. It will also be appreciated by the person skilled in the art and in the light of the present disclosure, that a number of other fastening means may also be used for detachably retaining the straps 18 to the band 16.

The width of the straps 18 may be somewhat less than the width of the band 16 because the straps 18 are under tension stresses only. The preferred dimensions for the straps are about 2 inches in width and about 1/8 inch thick.

The lower end of the secondary containment retrofit bag of the preferred embodiment has a flanged connection 22 for sealing an opening in the bag around the outlet tubing system 24 of the reservoir 12. The details of the flange connection 22 will be explained later when making reference to FIG. 6.

Figures 3, 4:
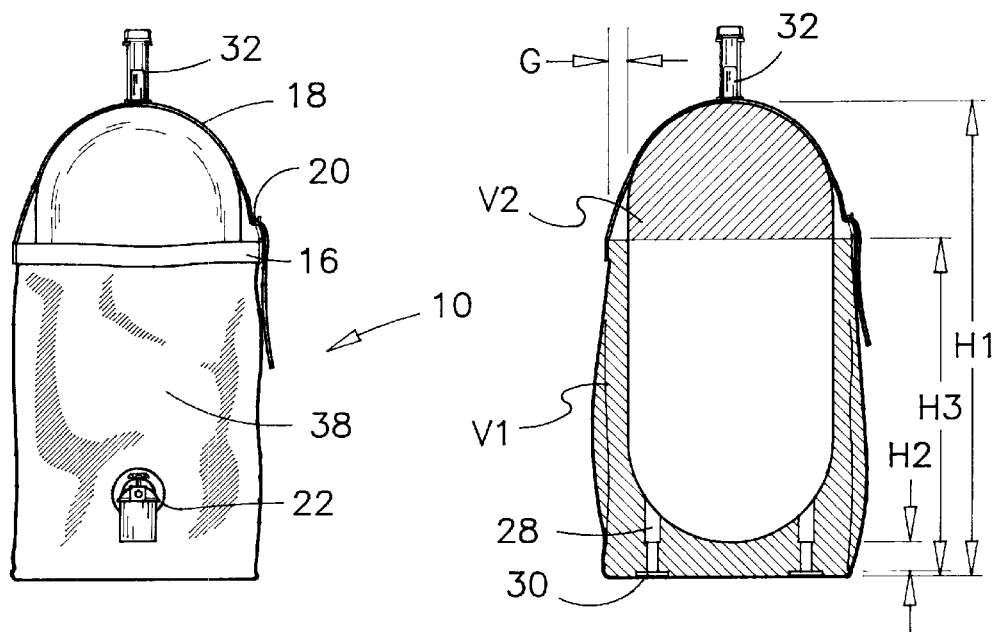
FIG. 3 is a left end view of the secondary containment bag of the first preferred embodiment installed under a residential heating oil reservoir.
FIG. 4 is a cross-section view of the secondary containment bag of the first preferred embodiment as seen along line 4—4 in FIG. 1.

Referring now to FIG. 4, the 200 imperial gallon reservoir illustrated therein has a height "$H_1$" above the ground of about 51 inches when the reservoir is mounted on legs 28 having a height "$H_2$" of about 6 inches. The reservoir 12 is preferably mounted on hard rubber pads 30 bonded to the bottom surface of the bag 10 for absorbing the weight of the reservoir, and for preventing the abrasion of the bag under the legs of the reservoir.

The height "$H_3$" of the secondary containment retrofit bag of the preferred embodiment is about 39 inches. The perimeter of the rim portion of the secondary containment retrofit bag 10 of the preferred embodiment is about 8–10 inches more than the horizontal perimeter of the reservoir 12 such that a gap "G" of at least one inch is maintained between the reservoir 12 and the inside surface of the bag 10.

The gap "G" ensures that any fluid which may be accidentally spilled on the surface of the reservoir or along the fill or vent pipes 32, during filling of the reservoir for example, will flow into the secondary containment bag 10. The space "G" between the reservoir and the bag, and the open upper end of the bag are further advantageous for maintaining an air circulation inside the bag for preventing condensation on the surface of the reservoir. The air circulation inside the bag is further advantageous for carrying away any odour that may emanate from a leak and for quickly warn a homeowner of the presence of a leak before the condition reaches a critical stage.

The volume $V_1$ of the bag 10 having the above dimensions is approximately 48 imperial gallons. The volume $V_2$ inside the reservoir 12 above the rim of the bag 10 is about 46 imperial gallons. Therefore, in case of a leak, the secondary containment retrofit bag 10 of the first preferred embodiment is able to contain the full content of the reservoir 12. Furthermore, the space "G" between the bag and the reservoir allows the insertion of a hose inside the bag for draining the content of the bag 10 after a leak for example.

The secondary containment retrofit bag 10 of the preferred embodiment is made of a single piece of fabric or a sheet of flexible material as explained previously and as better illustrated in FIG. 5. The folds 14 in the fabric or flexible material between the side portions 36 and the end portions 38 are preferably inserted inside the bag 10 alongside the side portions 36. The folds 14 are preferably bonded to the side portions 36.

Figure 5:
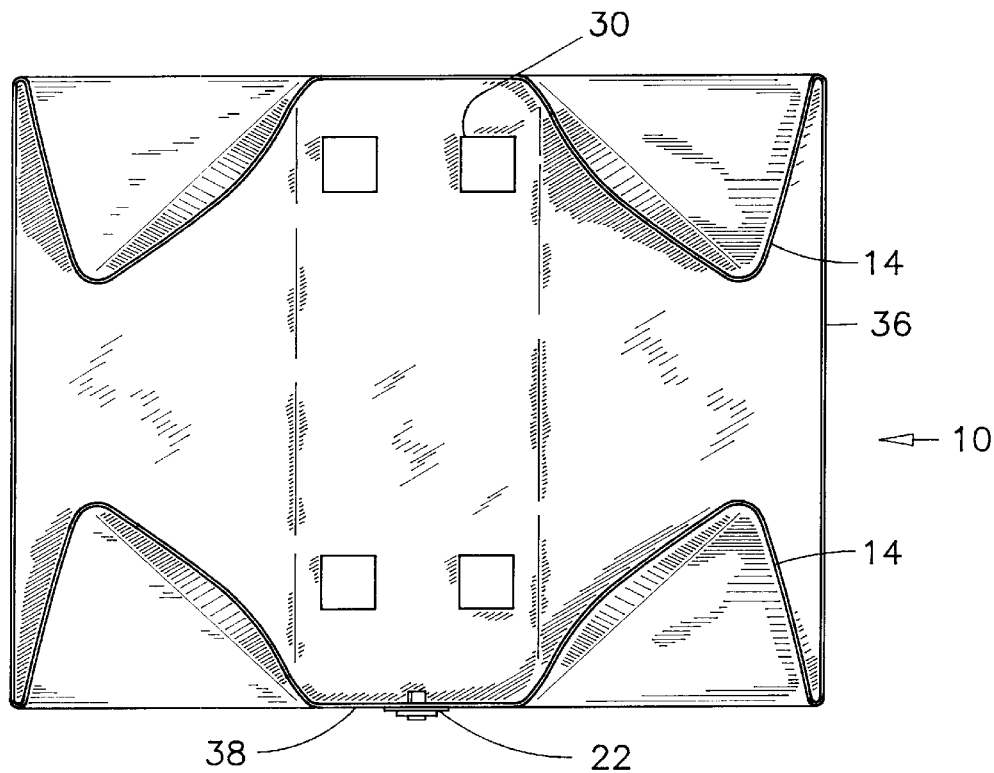
FIG. 5 is a top view of the secondary containment bag of the first preferred embodiment when the bag is being manufactured. The illustration shows a preferred folding of the material of the bag.

After folding the fabric in this manner, the band 16 is sewn or bonded and sewn to the upper edges of the bag for securing the folds 14 to the side portions 36 and for securing the side portions 36 to the end potions 38 in order to obtain a sturdy and leak-proof construction. The rubber pads 30 are bonded to the bottom surface of the bag 10 at locations to match the spacing of the legs 28 of the reservoir 12, as illustrated in FIG. 5.

Figure 6:
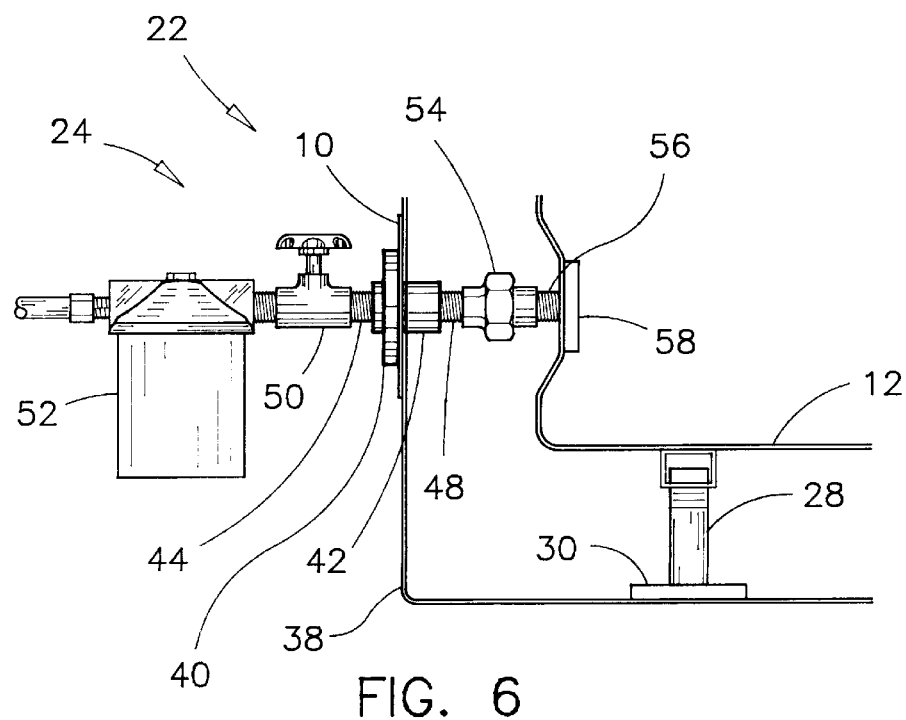
FIG. 6 is a side view of the piping connection through the bag of the first preferred embodiment.

Referring now to FIG. 6, the flanged connection 22 is illustrated therein. The flanged connection 22 has a circular disc 40 which is bonded to the end portion 38 of the bag 10 around an aperture in the end portion 38. The connection 22 further has a tubular member 42 bonded through the disc 40 or making integral part of the disc 40. The tubular member 42 has a threaded connection for receiving an outside pipe nipple 44 extending outside the bag 10, and an inside pipe nipple 48 extending inside the bag. The outside pipe nipple 44 is typically connected to a shut-off valve 50 and a filter 52 on the outlet tubing system 24. The inlet pipe nipple 48 is connected to a pipe coupling 54, which is connected to a third pipe nipple 56 threaded into the reservoir's outlet fitting 58.

The secondary containment bag 10 of the preferred embodiment is preferably packaged and delivered to clients in a folded form. The bag is preferably deployed in a collapsed form and inserted under the reservoir with the legs 28 of the reservoir resting on the pads 30. This installation is preferably effected by tilting the reservoir lengthwise, raising one pair of legs at the time while inserting the bag and the rubber pads 30 under the raised legs. It will be appreciated that the installation is preferably effected by two persons when the reservoir 12 is empty or nearly empty such that it can be manipulated relatively easily.

The inlet side of the pipe coupling 54 is then connected to the outlet pipe nipple 56 of the reservoir. The outlet side of the pipe coupling 54 is preferably assembled to the inside pipe nipple 48, and to the flanged connection 22 prior to installing the bag under the reservoir. The pipe coupling 54 is then assembled for joining the outlet pipe nipple 56 to the outlet tubing system 24. This connection is preferably effected with the reservoir tilted slightly along its length for raising the outlet fitting 58 above the fluid level inside the reservoir. The rim 64 of the secondary containment bag 10 of the first preferred embodiment is then pulled upwardly and the straps are fastened over the reservoir 12 as shown in the FIGS. 1 to 4 for securing the bag to the reservoir.

It will further be appreciated by the person skilled in the art that when the reservoir 12 is installed below the elevation of the furnace's burner, as often seen in mobile homes, the length of the bag may be increased slightly for containing an outlet tubing system 24' oriented upwardly for example. The flanged connection 22 is thereby not required in these cases. This type of arrangement is illustrated in FIG. 7.

Figure 7:
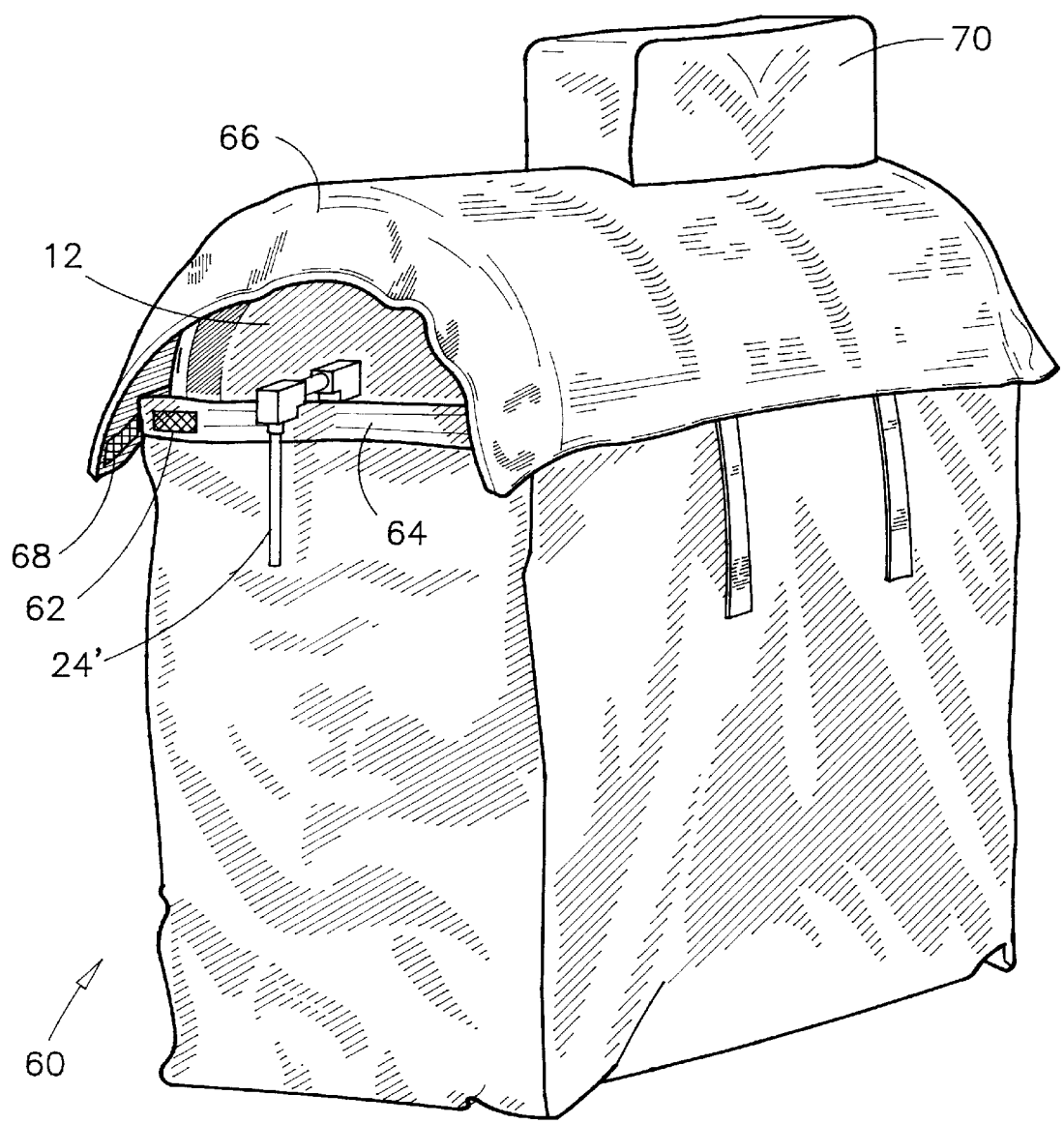
FIG. 7 is perspective view of the front and left end of the secondary containment bag of the second preferred embodiment installed on a residential heating oil reservoir. As is illustrated, the secondary containment bag of the second preferred embodiment has a flap for covering the upper part of the reservoir.

There is also illustrated in FIG. 7, a second preferred embodiment 60 of the secondary containment bag of the present invention. The bag 60 of the second preferred embodiment of the present invention is similar to the bag 10 of the first preferred embodiment described in the foregoing. The bag 60 of the second preferred embodiment 60, further has strips 62 of gripping material such as Velcro™ for example, along the longitudinal band 64. A flap 66 is detachably mounted to the longitudinal band 64 of the bag for covering the upper portion of the reservoir 12. The flap 66 has strips 68 of retainable material affixed to the periphery thereof for attachment to the strips 62 of gripping material such that the flap 66 is detachably retainable to the longitudinal band 64.

The covering flap 66 has a hood 70 extending above the surface thereof for covering the fill and vent pipes, and the fluid level gauge of the reservoir. The covering flap 66 of the secondary containment bag 60 of the second preferred embodiment is easily detached and lifted up by the heating oil delivery person for example, for filling the reservoir or for looking at the fluid level gauge. The covering flap 66 is convenient for covering the reservoir and for preventing the accumulation of precipitation, dust and leaves inside the bag 60 when the reservoir is installed outside a house for example.

The length of the covering flap 66 is preferably between about 10 to 16 inches longer than the oil reservoir 12, with half this surplus length extending of each end of the reservoir. Both ends of the flap are preferably left open as illustrated in FIG. 7 for maintaining an air circulation inside the bag with the associated advantages as previously explained.

The flexible and impermeable aspects of the material of the bags of the first and second preferred embodiments 10,60 are particularly convenient for cleaning the inside surfaces of the bags after a leak, even when the bag is still installed under a reservoir, or for cleaning and reusing a bag on a new replacement reservoir. The bags of the present invention are easily lowered by undoing the belt and buckle connections. With the bag in a collapsed form, it is relatively easy to reach in and to wipe and sponge off any fluid residues from inside the bag.

While the preferred embodiments have been described for use on a residential heating oil reservoir having a fluid capacity of 200 imperial gallons, it will be appreciated that the bags of the present invention can be used on different volume tanks as well as on reservoirs having configurations other than the conventional oblong shape of the illustrated reservoir.

Therefore, the preferred embodiments of the invention as illustrated herein is not limited thereto, and it will be apparent to those skilled in the art that numerous modifications form part of the present invention insofar as they do not depart from the spirit, nature and scope of the described and claimed invention.

I claim:

1. A combination of a fluid reservoir having length, height and width and nominal content, and a fluid impermeable bag enclosing a lower portion of said reservoir;

said bag having an open upper end, a stiff rim around said open upper end, a vertical dimension and strap means circling an upper portion of said reservoir over said height thereof for retaining said rim at a fixed measure along said height of said reservoir; said bag having a nominal volume being at least said nominal content of said reservoir and hard rubber pads affixed to a bottom portion thereof for absorbing a weight of said reservoir and preventing abrasion of said bag;

whereby when said reservoir leaks, fluid leaking therefrom is containable in said bag.

2. The combination as claimed in claim 1, wherein said reservoir is a residential heating oil reservoir and said bag is made of an oil impermeable material.

3. The combination as claimed in claim 2, wherein said bag is made of a fire-retardant material.

4. The combination as claimed in claim 2, wherein said reservoir has a height of 51 inches and said bag has a height of about 39 inches.

5. The combination as claimed in claim 2, wherein a volume of said reservoir is about 200 imperial gallons and a volume of said bag outside said reservoir is about 48 imperial gallons.

6. The combination as claimed in claim 5 wherein a perimeter of said bag is about between 8 to 10 inches more than twice said length plus twice said width.

7. The combination as claimed in claim 2, wherein said bag further has a flap member extending over an upper portion of said reservoir.

8. The combination as claimed in claim 7, wherein said flap is retainable to said rim by a combination of strips of gripping material and strips of retainable material.

9. The combination as claimed in claim 7, wherein a dimension of said flap is between about 10 to about 16 inches longer than said length of said reservoir.

10. The combination as claimed in claim 9, wherein said reservoir has fill and vent pipes extending upwardly above said height and said flap comprises a hood member covering said fill and vent pipes.

11. The combination as claimed in claim 1, wherein said strap means comprises a pair of straps and a pair of buckles affixed to said rim, and said straps are detachably retainable in said buckle.

12. The combination as claimed in claim 1, wherein a lower portion of said bag is stitch-free.

13. The combination as claimed in claim 12, wherein said bag is manufactured from a single sheet of flexible material having folds tucked inside said bag.

14. The combination as claimed in claim 1, wherein said stiff rim is made with lifting-sling-type material having a width of about 3 inches and a thickness of about 3/16 of an inch.

15. The combination as claimed in claim 1, wherein said straps are made with lifting-sling-type material having a width of about 2 inches and a thickness of about 1/8 of an inch.

16. A combination of a fluid reservoir having length, height and width, nominal content and an outlet tubing system, and a fluid impermeable bag enclosing a lower portion of said reservoir;

said bag having an open upper end, a stiff rim around said open upper end, a vertical dimension and strap means circling an upper portion of said reservoir over said height thereof for retaining said rim at a fixed measure along said height of said reservoir; said bag having a nominal volume being at least said nominal content of said reservoir; said bag having an opening through an end thereof circling said outlet tubing system, and a flanged connection bonded to said bag for sealing said opening around said outlet tubing system;

whereby when said reservoir leaks, fluid leaking therefrom is containable in said bag.

17. The combination as claimed in claim 16, wherein said flanged connection comprises a pipe coupling inside said bag.

18. A fluid impermeable bag for enclosing a residential heating oil reservoir; said bag comprising:

an open upper end;

a stiff rim around said open upper end;

a vertical dimension;

strap means extending from said stiff rim above said open upper end for circling an upper portion of a reservoir when said bag is adapted to be installed under said reservoir; and a flap affixed to said stiff rim for covering an upper portion of said reservoir when said bag is adapted to be installed under said reservoir; said flap having a hood member mounted thereon for covering fill and vent pipes on a reservoir when said bag is adapted to be installed under said reservoir and said flap is adapted to be attached to said stiff rim;

such that said bag with said flap are mountable on a residential heating oil reservoir located outdoors for simultaneously containing leaks from said reservoir and for preventing precipitations from accumulating in said bag.

19. The fluid impermeable bag as claimed in claim 18, wherein a material of construction thereof is a single sheet of flexible material having folds tucked therein.

20. The fluid impermeable bag as claimed in claim 18, further comprising pad means associated with a bottom portion thereof for absorbing a weight of a reservoir and preventing abrasion thereof when said bag is adapted to be installed under said reservoir.

\* \* \* \* \*